United States Patent [19]
Poole

[11] Patent Number: 5,953,866
[45] Date of Patent: Sep. 21, 1999

[54] STORM SHELTER

[76] Inventor: James Riley Poole, 314 Pleasant St., Mount Orab, Ohio 45154

[21] Appl. No.: 09/093,182

[22] Filed: Jun. 8, 1998

Related U.S. Application Data

[63] Continuation of application No. 08/580,876, Dec. 29, 1995, abandoned.

[51] Int. Cl.$^6$ .................................................. E02D 27/32
[52] U.S. Cl. ........................... 52/169.6; 52/19; 52/169.1; 109/15
[58] Field of Search .................................. 52/19, 20, 21, 52/169.6, 169.1; 109/15

[56] References Cited

U.S. PATENT DOCUMENTS

| | | | |
|---|---|---|---|
| 3,093,097 | 6/1963 | Rosenfeld | 52/169.6 |
| 3,118,148 | 1/1964 | Taylor et al. | 52/169.6 |
| 3,258,885 | 7/1966 | Lodige | 52/169.6 |
| 4,805,360 | 2/1989 | Kuehnl | 52/169.1 |
| 4,955,166 | 9/1990 | Qualline et al. | 52/169.6 |
| 5,115,613 | 5/1992 | McCarthy | 52/169.6 |
| 5,794,389 | 8/1998 | Vysma | 52/169.6 |

*Primary Examiner*—Christopher Kent
*Assistant Examiner*—Yvonne Horton-Richardsen
*Attorney, Agent, or Firm*—David L. Volk

[57] ABSTRACT

A storm shelter is provided having a modular rectangular shelter housing. An egress port extends slightly above the shelter housing, such that the housing can be buried underground with the egress port extending slightly above ground. A reinforced, sliding access door is mounted at the egress port, and a stairway is provided to allow descent into the shelter housing. A plurality of seat boxes is provided which can be utilized to contain tools, supplies, or the like, with a seat lid pivotally mounted in a hinged manner to each seat box. Each step is provided with a non-skid surface, and is sufficiently large enough to provide a seating surface. The top stair has an accessible cut-out panel for allowing an emergency jack to pass through. An emergency jack can be utilized to forcibly remove the door, should the door become stuck or blocked from the outside.

15 Claims, 5 Drawing Sheets

STORM SHELTER

REFERENCE TO RELATED APPLICATIONS

This application is a continuation of application Ser. No. 08/580,876, filed Dec. 29, 1995, now abandoned.

BACKGROUND OF THE INVENTION

1. Field of the Invention

The present invention relates generally to storm shelters and, more particularly, to an underground, modular storm shelter.

2. Description of the Related Art

In the related art, several storm shelters are known. For example, in U.S. Pat. No. 4,955,166 to Qualine et al. a tornado underground shelter is disclosed having a truncated globe forming a generally spherical tornado shelter.

And, in U.S. Design Pat. No. 337,166 to Kluzek an ornamental design for a storm cellar is disclosed. Also, in U.S. Design Pat. No. 261,432 to Ballard an ornamental design for an emergency shelter for underground installation is disclosed. And finally, in U.S. Design Pat. No. 242,924 to McKnight, an ornamental design for an underground tornado shelter is also disclosed.

Although numerous attempts have been made to provide a safe, strong, inexpensive, and easy to manufacture storm shelter, a need remains for providing an apparatus and kit which provide such attributes.

SUMMARY OF THE INVENTION

It is therefore an object of the present invention to provide an improved storm shelter.

It is another object of the present invention to provide an improved storm shelter being modularly designed in order to provide for the coupling together of standard sized units to provide increased capacity.

It is a feature of the present invention to provide an improved storm shelter having a sliding access door with an emergency egress jack capable of removing the door to provide egress should the door become obstructed during a storm.

Briefly described according to one embodiment of the present invention, a storm shelter is provided having a modular rectangular shelter housing. An egress port extends slightly above the shelter housing, such that the housing can be buried underground with the egress port extending slightly above ground. A reinforced, sliding access door is mounted at the egress port, and a stairway is provided to allow descent into the shelter housing. The stairway consists of a pair of parallel stair stringers containing a plurality of steps, each having a non-skid upper surface. The top stair has an accessible cut-out panel for allowing an emergency jack to pass through. The emergency jack can be utilized to forcibly remove the door, should the door become stuck or blocked from the outside. Within the shelter housing are located a plurality of seat boxes. Each seat box can be utilized to contain tools, supplies, or the like. A seat lid is pivotally mounted in a hinged manner to each seat box. Each seat lid is provided with a padded surface, and is sufficiently large enough to provide a seating surface.

An advantage of the present invention is that the storm shelter can be buried, thereby minimizing its profile and providing an aesthetically more pleasing structure.

Another advantage of the present invention is that each stair comprises both storage and seating capacity.

Further, a preferred embodiment of the present invention has an emergency jack which can be utilized to forcibly remove the door, should the door become stuck or blocked from the outside

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION

Figure 1:
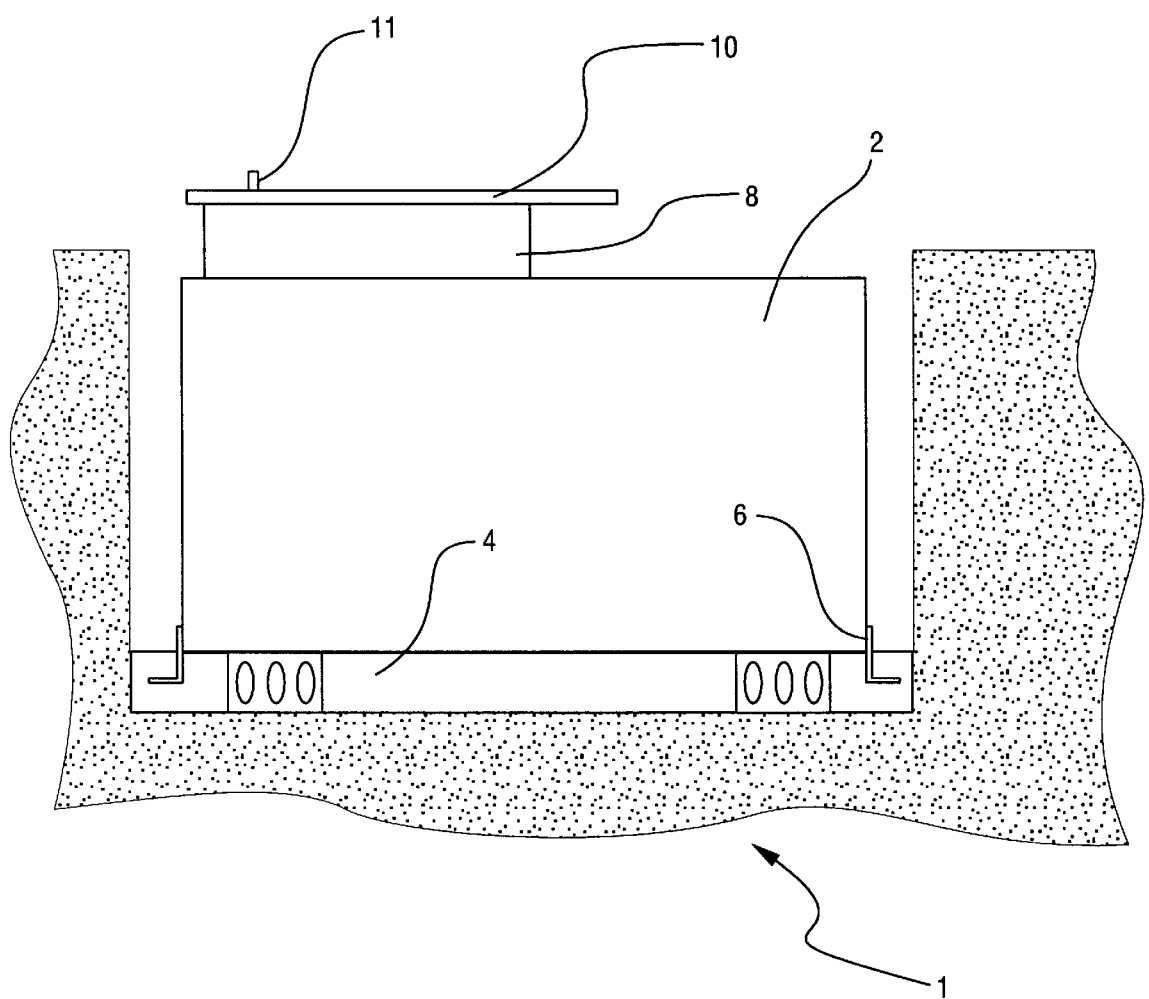
FIG. 1 is a side elevational view of a storm shelter according to the preferred embodiment of the present invention.

Referring now to FIG. 1, a storm shelter 1 is shown, according to the present invention, having a modular rectangular shelter housing 2. As shown in FIG. 1, the storm shelter 1 can be placed within the ground on a concrete slab 4 and mounted thereto by first anchoring means 6. A concrete slab 4 would prevent hydrostatic lift of the storm shelter 1, as well as provide a leverage surface for an emergency jack 24, as will be described later. An egress port 8 extends slightly above the shelter housing 2, such that the housing can be buried underground with the egress port 8 extending slightly above ground. A reinforced, sliding access door 10 having a pair of handles 11 (one mounted each to the outer and inner surface) is mounted at the egress port 8. A plurality of seat boxes 16 are also provided within the shelter housing 2. Each seat box 16 can be utilized to contain tools, supplies, or the like. A seat lid (not shown) is pivotally mounted in a conventional hinged manner to each seat box 16.

Figure 2:
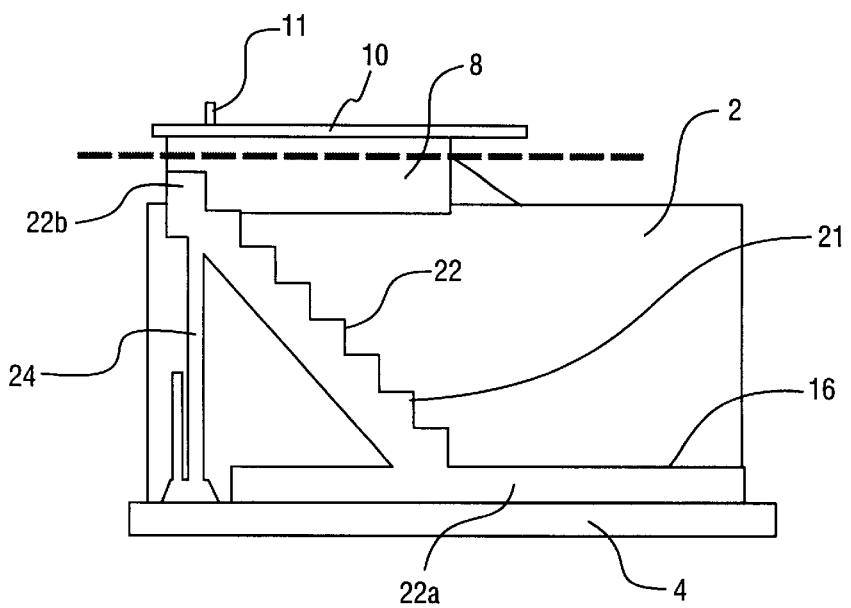
FIG. 2 is a side cross sectional view thereof.

As shown more clearly in FIG. 2, a stairway 20 is provided to allow descent into the shelter housing 2. The stairway 20 consists of a pair of parallel stair stringers containing a plurality of steps 22. The bottom step 22a is affixed to the floor of the shelter housing 2, and the top step 22b is affixed to the wall of the egress port 8. Each step 22 is provided with a non-skid surface.

Figure 3:
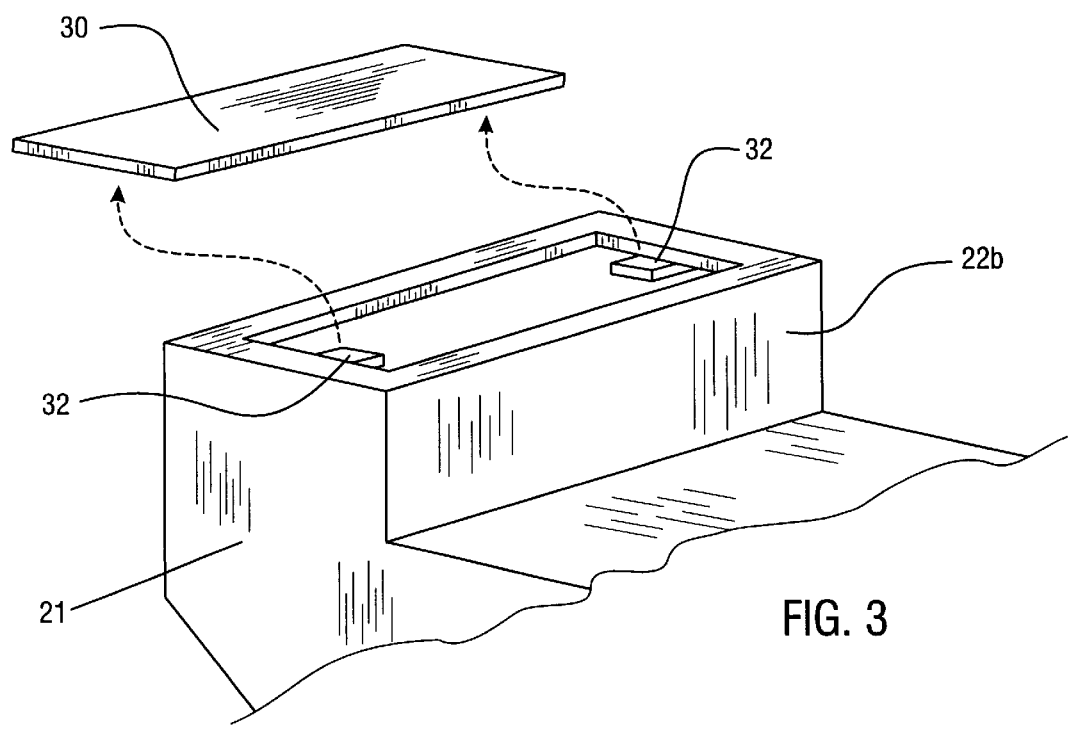
FIG. 3 is a detailed perspective of a top step for use therewith.

As shown in FIG. 3, the top step 22b has an accessible cut-out panel 30 held in place by extended tabs 32, for allowing the emergency jack 24 to pass through. The emergency jack 24 can be utilized to forcibly remove the door 10, should the door 10 become stuck or blocked from the outside.

Figure 4:
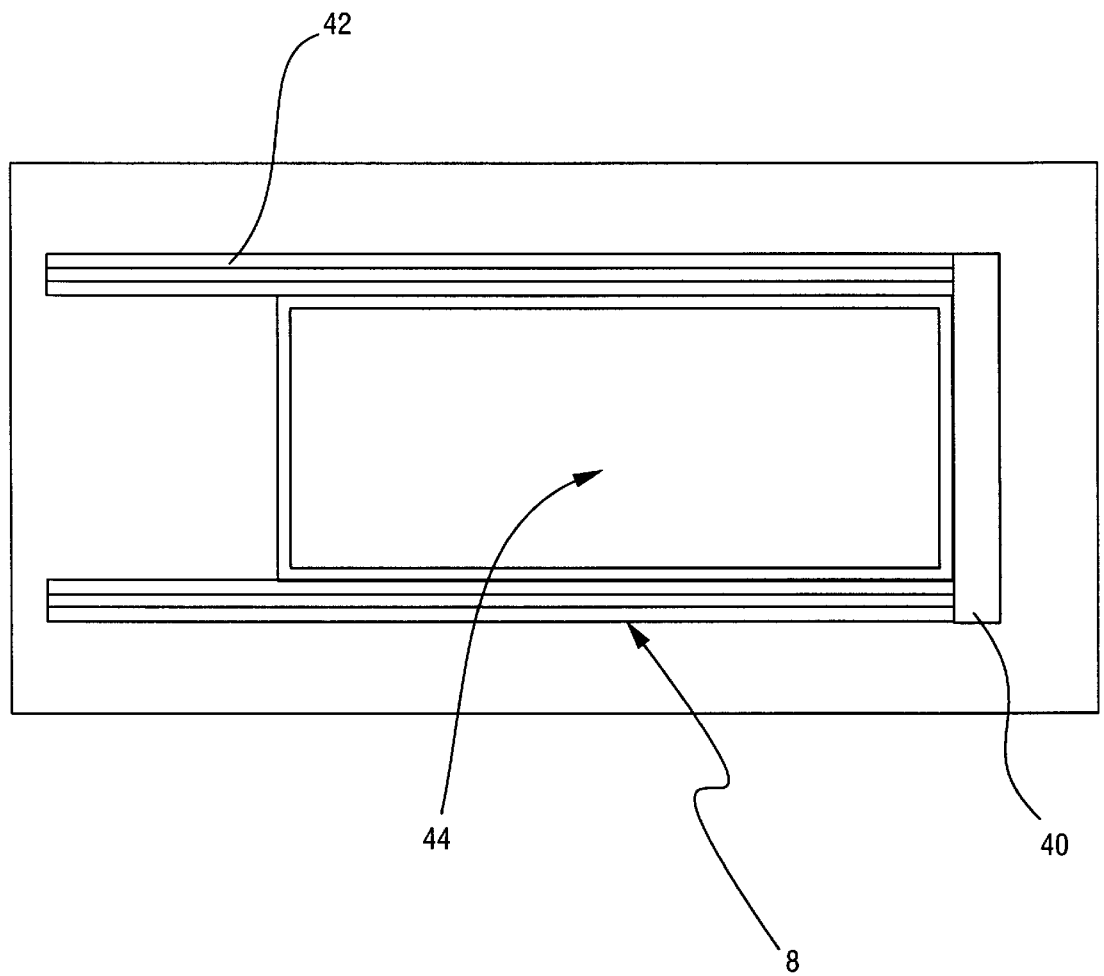
FIG. 4 is a detailed partial top plan view of an egress port.
Figure 5:
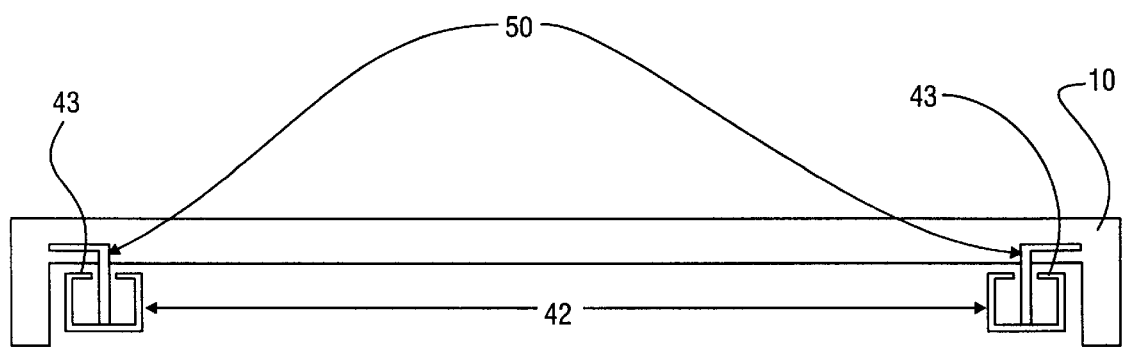
FIG. 5 is a detailed partial end view of an entrance door.

FIG. 4 and FIG. 5 show in greater detail the construction of the egress port 8 and sliding door 10. To one side of the egress port 8 is a door stop 40. Perpendicularly to the door stop 40 are a pair of parallel slotted slide rails 42, each extending past an entryway 44 within the egress port 8. As shown more clearly in FIG. 5, a pair of tracks 50 are mounted to the inside surface of the door 10, and extend downward in an aligned manner to insert within the slots 43 of the slotted slide rails 42.

Figure 6:
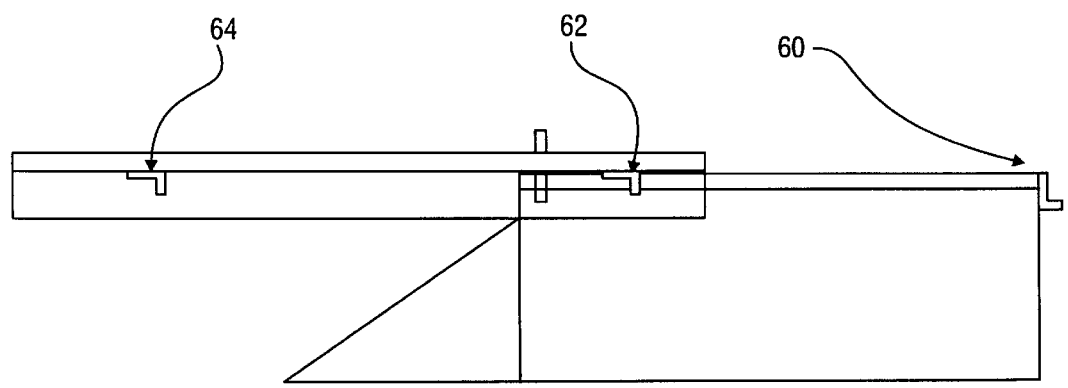
FIG. 6 is a detailed partial end view of an entrance door.

As shown in FIG. 6, a first door stop 60 protrudes slightly upwards above the slots 43, and form an impact barrier to the rails 50 when the door 10 is closed. Further, a second door stop 62 and a third door stop 64 are provided affixed to the inside surface of the door 10, to further form an impact barrier between the doors stops 62, 63 and the vertical sidewalls of the egress port 8.

Figure 7:
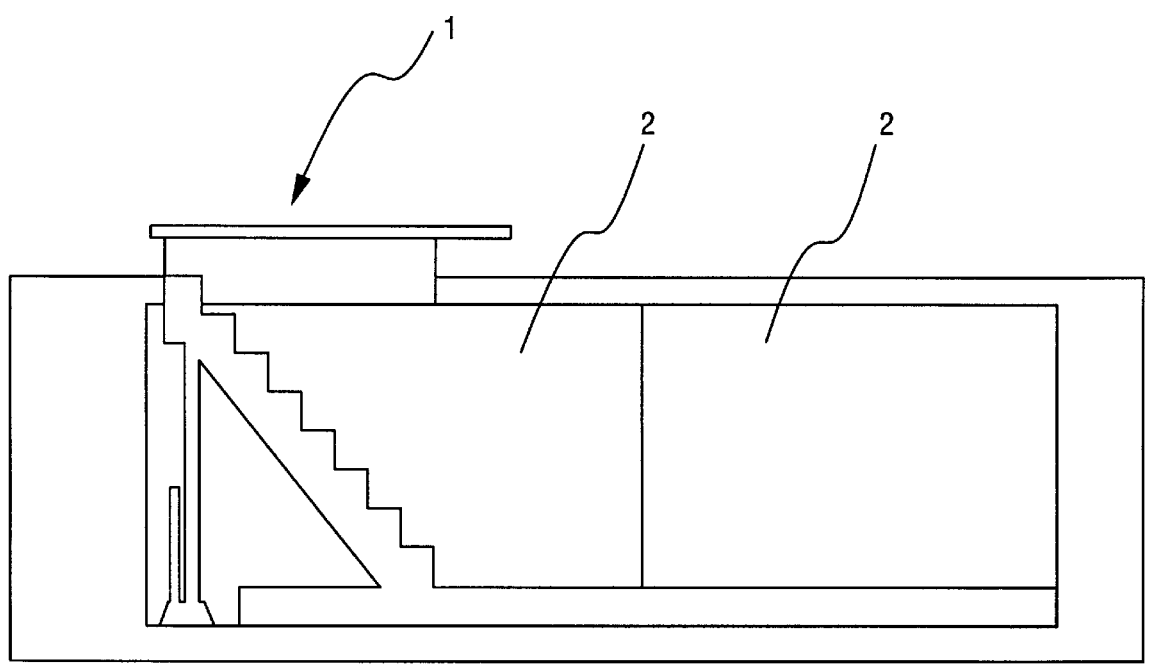
FIG. 7 is a side elevational view of a storm shelter according to an alternate embodiment of the present invention.

In accordance with a preferred embodiment of the present invention, as shown in the figures, the storm shelter 1 can be used as a retreat from danger caused by weather, temperature, or other disasters. Further, as depicted in FIG. 7, additional shelter space can be achieved by coupling a plurality of the modular rectangular shelter housings 2 together.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

What is claimed is:

1. A storm shelter comprising:
    a modular rectangular shelter housing;
    an egress port extends slightly above the shelter housing, such that when the housing is buried underground the egress port extends slightly above ground;
    a reinforced, sliding access door mounted to said egress port, said door having an inside surface, and outside surface, and a pair of handles, one mounted to each said surface;
    a stairway to allow descent into the shelter housing, said stairway having a pair of parallel stair stringers containing a first step, a last step, and a plurality of steps between said first and said last step;
    an emergency jack configured to forcibly remove said door, should said door become stuck or blocked; and
    an accessible cut-out panel mounted to said first step allowing an emergency jack to pass through said first step.

2. The storm shelter as described in claim 1, further comprising at least one seat box for storing tools, supplies, or the like, said seat box having a box container and a seat lid, said seat lid being pivotally mounted in a hinged manner to said box container.

3. The storm shelter as described in claim 1, wherein each step further comprises a non-skid upper surface.

4. The storm shelter as described in claim 1, wherein said sliding access door comprises:
    a pair of parallel slotted slide rails each mounted to and extending past said egress port;
    each of the slotted side rails forming a slot therein; and
    a pair of tracks mounted to the inside surface of said door and extend downward in an aligned manner to insert within the slots of said slotted slide rails.

5. The storm shelter as described in claim 4, wherein said sliding access door further comprises:
    a first door stop protruding slightly upwards above said slots and forming an impact barrier to said rails when said door is closed.

6. The storm shelter as described in claim 5, wherein said sliding access door further comprises:
    at least one second door stop affixed to the inside surface of the door to further form an impact barrier between the door stops and a vertical sidewalls of the egress port.

7. The storm shelter as described in claim 5, further comprising additional modular rectangular shelter housings configured to couple to said storm shelter thereby providing additional shelter area.

8. In a storm shelter having a shelter housing and having an egress port extending slightly above the shelter housing, such that when the housing is buried underground the egress port extends slightly above ground and further having a stairway to allow descent into the shelter housing, said stairway having a pair of parallel stair stringers containing a first step, a last steps, and a plurality of steps between said first and said last step, wherein the improvement comprises:
    a reinforced, sliding access door mounted to said egress port, said door having an inside surface, and outside surface, and a pair of handles, one mounted to each said surface;
    an emergency jack configured to forcibly remove said door, should said door become stuck or blocked; and
    an accessible cut-out panel mounted to said first step allowing an emergency jack to pass through said first step.

9. In the storm shelter as described in claim 8, wherein the improvement further comprises at least one seat box for storing tools, supplies, or the like, said seat box having a box container and a seat lid, said seat lid being pivotally mounted in a hinged manner to said box container.

10. The storm shelter as described in claim 8, wherein each step further comprises a non-skid upper surface.

11. The storm shelter as described in claim 8, wherein said sliding access door comprises:
    a pair of parallel slotted slide rails each mounted to and extending past said egress port;
    each of the slotted side rails forming a slot therein; and
    a pair of tracks mounted to the inside surface of said door and extending downward in an aligned manner to insert within the slots of said slotted side rails.

12. The storm shelter as described in claim 11, wherein said sliding access door further comprises:
    a first door stop protruding slightly upwards above said slots and forming an impact barrier to sa id rails when said door is closed.

13. The storm shelter as described in claim 12, wherein said sliding access door further comprises:
    at least one second door stop affixed to the inside surface of the door to further form an impact barrier between the door stops and a vertical sidewalls of the egress port.

14. The storm shelter as described in claim 13, further comprising additional modular rectangular shelter housings configured to couple to said storm shelter and for providing additional shelter area.

15. A storm shelter comprising:
    a modular shelter housing;
    an egress port extends slightly above the shelter housing, such that when the housing is buried underground the egress port extends slightly above ground;
    an access door mounted to said egress port;
    a stairway to allow descent into the shelter housing, said stairway having a first step, a last step, and a plurality of steps between said first and said last step;
    an emergency jack configured to forcibly remove said door, should said door become stuck or blocked; and
    a removable panel mounted to said first step allowing an emergency jack to pass through said first step.

* * * * *